United States Patent [19]

Chenevey et al.

[11] Patent Number: 4,487,735
[45] Date of Patent: Dec. 11, 1984

[54] PROCESS FOR PREPARING FILM OF POLY{[BENZO(1,2-D:4,5-D')BISTHIAZOLE-2,6-DIYL]-1,4-PHENYLENE}, ITS CIS ISOMER OR MIXTURES THEREOF

[75] Inventors: Edward C. Chenevey, North Plainfield; Ronald Kafchinski, Winfield, both of N.J.

[73] Assignee: Celanese Corporation, New York, N.Y.

[21] Appl. No.: 483,797

[22] Filed: Apr. 11, 1983

[51] Int. Cl.³ .............................................. B29D 7/20
[52] U.S. Cl. ................................. 264/85; 264/184; 264/210.4; 264/216; 264/233; 264/235.6; 264/331.12; 528/183; 528/185; 528/337; 528/351
[58] Field of Search .............. 264/216, 331.12, 210.2, 264/233, 210.4, 85, 210.3, 184, 235.6; 528/337, 185, 351, 183

[56] References Cited

U.S. PATENT DOCUMENTS

| | | | |
|---|---|---|---|
| 3,313,783 | 4/1967 | Iwakava et al. | 528/337 |
| 3,574,170 | 4/1971 | Chenevey | 528/351 |
| 4,051,108 | 9/1977 | Helminiak et al. | 528/185 |
| 4,148,774 | 4/1979 | Silver | 528/337 |
| 4,225,700 | 9/1980 | Wolfe et al. | 528/337 |
| 4,359,567 | 11/1982 | Evers | 528/185 |
| 4,377,546 | 3/1983 | Helminiak et al. | 528/183 |
| 4,405,550 | 9/1983 | Hungerford | 264/216 |
| 4,423,202 | 12/1983 | Choe | 528/377 |

Primary Examiner—Jeffery Thurlow
Attorney, Agent, or Firm—Barris, Doane, Swecker & Mathis

[57] ABSTRACT

A film of poly{[benzo(1,2-d:4,5-d')bisthiazole-2,6-diyl]-1,4-phenylene}, its cis isomer or mixtures thereof is formed by extruding a solution of the polymer on a casting roll which is rotating to yield a surface speed slightly greater than the rate of extrusion. The solution of the polymer may be prepared by dissolving the polymer in an appropriate solvent or by reacting the monomers in a selected reaction medium. The cast film is washed, subjected to an elevated temperature, preferably heat treated under tension, and recovered.

16 Claims, No Drawings

PROCESS FOR PREPARING FILM OF POLY{[BENZO(1,2-D:4,5-D')BISTHIAZOLE-2,6-DIYL]-1,4-PHENYLENE}, ITS CIS ISOMER OR MIXTURES THEREOF

BACKGROUND OF THE INVENTION

1. Field of the Invention

This invention relates to a process for preparing film of poly{[benzo(1,2-d:4,5-d')bisthiazole-2,6-diyl]-1,4-phenylene}, its cis isomer or mixtures thereof.

2. Description of the Prior Art

The preparation of shaped articles such as fibers, filaments, yarns and films composed of polybenzothiazoles is known in the art. In U.S. Pat. No. 3,681,297, a selected dialdehyde is reacted with a defined aromatic bismercaptoamine to obtain a polybenzothiazoline. This material is then subjected to oxidation to obtain the related polybenzothiazole. In the event that unconverted reactants remain, the patent discloses that the polymer may be heated in excess of 175° C., preferably in the range of 250°–400° C. in nitrogen or 250°–350° C. in air to cause chain extending polymerization.

In U.S. Pat. No. 4,051,108, two-dimensional microscopic sheets or coatings are formed by initially dissolving a formed para ordered aromatic heterocyclic polymer in a polymer solution such as methanesulfonic acid. The polymer solution is added to a non-solvent for the polymer thereby causing the polymer to precipitate. The polymer particles are collected by filtration, such as by using a fritted glass filter, or by dipping an object in the dispersion. Evaporation of the solvent can be accelerated by employing a forced air oven. A similar technique is described in U.S. Pat. No. 3,987,015.

In U.S. Pat. No. 3,313,783, high molecular weight polybenzimidazoles are prepared by reacting at least one inorganic acid salt of an aromatic tetra-primary amine and at least one dicarboxylic acid or derivative thereof in a polyphosphoric acid medium at a elevated temperature in the range of from about 100° to 250° C.

In U.S. Pat. No. 4,225,700, poly{[benzo(1,2-d:4,5-d')bisthiazole-2,6-diyl]-1,4-phenylene} is prepared by reacting 2,5-diamino-1,4-benzenedithiol dihydrochloride with terephthalic acid in polyphosphoric acid.

It is also known in the art to heat treat articles made of distinctive types of polymeric materials. Thus, in U.S. Pat. Nos. 3,975,487, 4,183,895 and 4,247,514, articles composed of aromatic polyesters are heat treated whereas in U.S. Pat. Nos. 3,671,542 and 3,574,170 aromatic polyamides and poly(bisbenzimidazolbenzophenanthroline), respectively, are heat treated. However, no known prior art discloses or suggests that articles prepared from poly{[benzo(1,2-d:4,5-d')bisthiazole-2,6-diyl]-1,4-phenylene}, its cis isomer or mixtures thereof may be heat treated in accordance with the present invention to obtain the significant advantages described hereinafter.

In U.S. Pat. No. 3,574,170, poly(bisbenzimidazolbenzophenanthroline) is prepared by reacting at least one organic tetra-amine with at least one tetracarboxylic acid or its corresponding dianhydride. The patent refers to a concurrently filed application Ser. No. 867,880 (now abandoned) which application describes a process of preparing shaped articles of the specified polymer by direct extrusion of the polymerization medium into a coagulation bath. Similarly, wholly aromatic carbocyclic polycarbonamide shaped articles may be prepared from the polymerization medium as disclosed, for example, in U.S. Pat. No. 3,819,587.

No prior art of which applicants are aware discloses or suggests that film of poly{[benzo(1,2-d:4,5-d')bisthiazole-2,6-diyl]-1,4-phenylene}, its cis isomer of mixtures thereof may be prepared in accordance with the present invention.

In application Ser. No. 483,799 filed concurrently herewith by Edward C. Chenevey, entitled "Process for Heat Treating Shaped Articles of Poly{[benzo(1,2-d:4,5-d')bisthiazole-2,6-diyl]-1,4-phenylene}, Its Cis Isomer and Mixtures Thereof and the Articles Formed Thereby" and assigned to the assignee of the present application, there is described a process for simultaneously heating and stretching shaped articles of the defined polymer.

In application Ser. No. 483,799 filed concurrently herewith by Edward C. Chenevey and Thaddeus E. Helminiak, entitled "Process for Preparing Shaped Articles of Rigid Rod Heterocyclic Liquid Crystalline Polymers" and assigned to the assignee of the present application, there is described a process for preparing shaped articles of polymers such as poly{[benzo(1,2-d:4,5-d')bisthiazole-2,6-diyl]-1,4-phenylene} by polymerizing the reactants in a reaction medium and directly forming the shaped articles therefrom.

OBJECTS AND SUMMARY OF THE INVENTION

Accordingly, it is a general object of the present invention to provide a novel process for preparing film of poly{[benzo(1,2-d:4,5-d')bisthiazole-2,6-diyl]-1,4-phenylene}, its cis isomer or mixtures thereof.

It is another object of the present invention to provide a process for preparing film of poly{[benzo(1,2-d:4,5-d')bisthiazole-2,6-diyl]-1,4-phenylene}, its cis isomer or mixtures thereof which exhibits high strength and high modulus.

It is yet another object of the present invention to provide a process for continuously preparing film of poly{[benzo(1,2-d:4,5-d')bisthiazole-2,6-diyl]-1,4-phenylene}, its cis isomer or mixtures thereof which exhibits high strength and modulus and which may be prepared with reduced cost and process complexity.

These and other objects, as well as the scope, nature and utilization of the invention will be apparent from the following summary and detailed description of the present invention.

In accordance with one aspect, the present invention provides a process for preparing film of poly{[benzo(1,2-d:4,5-d')bisthiazole-2,6-diyl]-1,4-phenylene}, its cis isomer or mixtures thereof. The process comprises:

(a) forming a solution of poly{[benzo(1,2-d:4,5-d')bisthiazole-2,6-diyl]-1,4-phenylene}, its cis isomer or mixtures thereof;

(b) extruding a film of the solution on a casting roll which rotates at a surface speed greater than the speed of extrusion thereby yielding a stretch of from about 100 to about 2400%;

(c) washing the film;

(d) subjecting the film to a temperature in the range of from about 100° to about 150° C. for from about 5 to about 30 seconds; and (e) recovering the film.

In another aspect the present invention provides a process for preparing film of poly{[benzo(1,2-d:4,5-d')bisthiazole-2,6-diyl]-1,4-phenylene}, its cis isomer or mixtures thereof. This process comprises:

(a) forming a reaction mixture comprising the reactants (1) 2,5-diamino-1,4-benzenedithiol dihydrochloride or 2,4 diamino-1,5-benzenedithiol dihydrochloride or mixtures thereof, (2) terephthalic acid and (3) a reaction medium selected from the group consisting of polyphosphoric acid, dehydrating phosphate acids and mixtures thereof;

(b) polymerizing the reactants whereby a solution of poly{[benzo(1,2-d:4,5-d')bisthiazole-2,6-diyl]-1,4-phenylene}, its cis isomer or mixtures therof is formed;

(c) extruding a film of the solution on a casting roll which rotates at a surface speed greater than the speed of extrusion thereby yielding a stretch of from about 100 to about 2400%;

(d) washing the film;

(e) subjecting the film to a temperature in the range of from about 100° to about 150° C. for from about 5 to about 30 seconds; and (f) recovering the film.

DESCRIPTION OF THE PREFERRED EMBODIMENTS

As stated hereinabove, the present invention relates to a process for preparing film of poly{[benzo(1,2-d:4,5-d')bisthiazole-2,6-diyl]-1,4-phenylene} in either the cis or trans form (both isomers are hereinafter collectively referred to as PBT). PBT is a rigid rod heterocyclic polymer which exhibits liquid crystalline (i.e., anisotropic) properties when in solution. The polymer has the repeating unit:

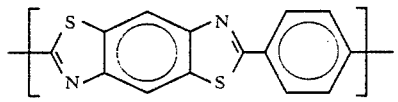

and/or

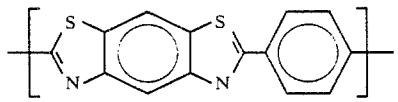

Of course, as should be understood by those of ordinary skill in the art, the available hydrogen atoms on the aromatic rings may be substituted with halogen atoms and short chain alkyl and alkoxy groups which do not substantially adversely affect the characteristics of the polymer. The formal name, the designation "PBT" as well as the illustrated recurring units are to be understood as encompassing such polymers.

To prepare the film of PBT in accordance with the present invention, a solution or dope of the polymer is initially formed. This may be accomplished by initially preparing the polymer by techniques known to those skilled in the art. Such techniques are exemplified in the disclosures of U.S. Pat. Nos. 3,574,170 and 4,225,700, the contents of which are incorporated by reference. The formed polymer is dissolved in a suitable solvent such as methanesulfonic acid, chlorosulfonic acid and mixtures thereof, preferably methanesulfonic acid. The solution typically comprises from about 5 to about 18% by weight of PBT.

Alternatively, the polymer solution may be formed by polymerizing the reactants for PBT in a reaction mixture and then directly extruding the film therefrom. More particularly, the reaction mixture is comprised of 2,5-diamino-1,4-benzenedithiol dihydrochloride and/or 2,4-diamino-1,5-benzenedithiol and terephthalic acid in about equimolar amounts which are dissolved in a reaction medium selected from the group consisting of polyphosphoric acid, dehydrating acids, such as phosphorous trioxide and phosphorous pentoxide, and mixtures thereof. The listed reaction mediums are available commercially or may be synthesized. In the instance of polyphosphoric acid, this may be achieved by adding phosphorus pentoxide to orthophosphoric acid and heating the mixture. A more complete discussion of this procedure is set forth in U.S. Pat. No. 3,313,783, the content of which is incorporated by reference.

Polymerization of the reactants is typically undertaken at a temperature in the range of from about 150° to about 220° C., preferably from about 170° to about 200° C., and at approximately atmospheric pressure, preferably from about 720 to about 800 mm.Hg. Although the process may be conducted under atmospheric conditions, the reaction is preferably conducted in the substantial absence of oxygen. That is, the reaction is preferably conducted in an atmosphere selected from the group consisting of nitrogen, helium, argon, neon, krypton, carbon dioxide and mixtures thereof with nitrogen being preferred. This reaction is to proceed until the intrinsic viscosity of the polymer is between about 20 and 30 dl./g. Polymer having an intrinsic viscosity of less than about 10 dl./g. exhibits poor strength properties. It will be understood that the reaction time to obtain substantially complete polymerization will vary depending on the reaction conditions. However, the reaction will typically require from about 6 to about 24 hours. Stirring at the beginning of the reaction is desirable to ensure an intimate uniform mixture.

After a solution comprised of from about 5 to about 15%, by weight of the PBT has been formed by dissolving the polymer in an appropriate solvent or by polymerizing the reactants in the reaction mixture, a film of PBT is prepared. The film is prepared by extruding the solution on a casting roll. Extrusion of the film is generally achieved at a temperature in the range of from about 0° to 250° C., preferably about 0° to about 150° C., and a pressure in the range of from about 100 to about 10,000 p.s.i.g.

A variety of casting rolls may be employed in the process as is well known to those versed in the art. An illustrative roll is generally cylindrical in shape, has a diameter of from about 8 to about 24 inches and is constructed with a smooth surface of stainless steel or chrome plating to resist corrosion. The lower portion of the roll is contacted, usually by immersion, in a coagulation bath which is comprised of an aqueous solution containing from about 0 to about 10% by weight of such materials as phosphoric acid or methanol, preferably phosphoric acid.

The casting roll is rotated to obtain a surface speed in the range of from about 1 to about 10 m./min. This speed is selected such that it is greatly in excess of the rate of extrusion whereby a stretch of from about 100 to about 2400%, preferably from about 200 to about 900% is imparted to the film. Such stretching corresponds to a spin draw ratio (i.e., the ratio of the surface speed of the casting roll to the extrusion rate) of about 2:1 to about 25:1, preferably from about 3:1 to about 10:1.

After the film is extruded onto the casting roll, it is washed to remove residual coagulating solution. This is generally achieved by passing the film through a bath comprising water or methanol. Alternatively, the film may be washed by being sprayed with the wash liquid.

It has been found that the washed film shrinks significantly upon drying. To obtain a clear smooth film, the wet film is heated to a temperature in the range of from about 100° to about 150° C. for from about 5 to about 30 seconds while being maintained under tension. Typically, a hot shoe contacts the film, but heating may also be achieved by employing a hot roll, oven, tube, or other similar type of apparatus which prevents "rolling" of the film and significant width shrinkage which otherwise occurs during drying.

The thusly formed film generally has a tenacity in the range of from about 3 to about 20 g./den. and a modulus of from about 300 to about 1500 g./den. and may be recovered by winding on a reel. To improve the properties of the film further, the film, prior to winding, may be subjected to a heat treatment step. This step entails passing the film through an oven at a temperature in the range of from about 375° to about 650° C. for from about 30 to about 240 seconds while subjecting the film to a stretch of from about 0.5 to about 6% stretch. The heat treatment is performed in an inert atmosphere, preferably of nitrogen. Film which has been thusly heat treated exhibits a tenacity in the range of from about 10 to about 20 g./den. and a modulus in the range of from about 1000 to about 2000 g./den.

By the present invention a clear, high strength, high modulus film of PBT may be prepared on a continuous basis at reduced cost and process complexity. The prepared film may be stored on rolls and may be used to form laminates and composites by methods known in the art.

To obtain a more complete understanding of the present invention, the following example of preparing films of PBT is set forth. It should be understood, however, that the invention is not limited to the specific details set forth therein.

EXAMPLE

Extrusion of a PBT reaction mixture in polyphosphoric acid containing 9.2% solids and having an intrinsic viscosity of 14 dl./g. is performed using a 0.5 inch wide die with a gap of 0.007 in. The film is extruded on a stainless steel casting roll which is rotated to obtain a spin draw ratio of 9. The film is carried by the roll into an aqueous coagulation bath and dried in a hot air oven. The process yields a film with a dry width of 4.5 mm., a denier of 440, a tenacity of 9.5 g./den., an elongation of 3.3% and a modulus of 720 g./den.

The properties of the thusly prepared film may be improved by heat treating the film is accordance with the invention set forth in previously identified, concurrently filed application Ser. No. 483,799. Heat treatment is achieved by passing the film through a heated nitrogen filled oven. Such treatment yields the results set forth in the following table.

| Temp. (°C.) | Time (sec.) | Stretch (%) | Tenacity (g./den.) | Elongation (%) | Modulus (g./den.) |
|---|---|---|---|---|---|
| 525 | 60 | 2.0 | 14.2 | 1.9 | 910 |
| 525 | 120 | 2.0 | 15.1 | 2.0 | 880 |
| 525 | 120 | 2.5 | 16.1 | 1.8 | 970 |
| 525 | 120 | 3.0 | 16.6 | 1.8 | 1040 |
| 525 | 120 | 3.5 | 16.7 | 1.8 | 1010 |

Although the invention has been described with preferred embodiments, it is to be understood that variations and modifications may be resorted to as will be apparent to those skilled in this art. Such variations are to be considered within the scope of the following claims.

We claim:

1. A process for preparing film of poly{[benzo(1,2-d:4,5-d')bisthiazole-2,6-diyl]-1,4-phenylene}, its cis isomer or mixtures thereof comprising:
    (a) forming a solution of poly{[benzo(1,2-d:4,5-d')bisthiazole-2,6-diyl]-1,4-phenylene}, its cis isomer or mixtures therof;
    (b) extruding a film of the solution on a casting roll which rotates at a surface speed greater than the speed of extrusion thereby yielding a stretch of from about 100 to about 2400%;
    (c) washing the film;
    (d) subjecting the film to a temperature in the range of from about 100° to about 150° C. for from about 5 to about 30 seconds; and
    (e) recovering the film.

2. The process of claim 1 wherein the solution comprises from about 5 to about 15% by weight of poly{[benzo(1,2-d:4,5-d')bisthiazole-2,6-diyl]-1,4-phenylene}, its cis isomer or mixtures thereof.

3. The process of claim 2 wherein the solution is formed by dissolving the poly{[benzo(1,2-d:4,5-d')bisthiazole-2,6-diyl]1,4-phenylene}, its cis isomer or mixtures thereof in a solvent selected from the group consisting of polyphosphoric acid, dehydrating phosphate acids and mixtures thereof.

4. The process of claim 3 wherein the casting roll has a surface speed of from about 1 to about 10 meters per min.

5. The process of claim 4 wherein the casting roll is contacted with a coagulation bath comprised of an aqueous solution containing from about 0 to about 10% by weight of a material selected from the group consisting of phosphoric acid and methanol.

6. The process of claim 5 wherein the film is washed with a liquid selected from the group consisting of water and methanol.

7. The process of claim 6 wherein heating of the film is conducted in an atmosphere comprised of nitrogen.

8. The process of claim 1 wherein the film is comprised of poly{[benzo(1,2-d:4,5-d')bisthiazole-2,6-diyl]-1,4-phenylene}.

9. A process for preparing film of poly{[benzo(1,2-d:4,5-d')bisthiazole-2,6-diyl]-1,4-phenylene}, its cis isomer or mixtures thereof comprising:
    (a) forming a reaction mixture comprising the reactants 2,5-diamino-1,4-benzenedithiol dihydrochloride or 2,4-diamino-1,5-benzenedithiol dihydrochloride or mixtures thereof and terephthalic acid and a reaction medium selected from the group consisting of polyphosphoric acid, dehydrating phosphate acids and mixtures thereof;
    (b) polymerizing the reactants whereby a solution of poly{[benzo(1,2-d:4,5-d')bisthiazole-2,6-diyl]-1,4-phenylene}, its cis isomer or mixtures thereof is formed;
    (c) extruding a film of the solution on a casting roll which rotates at a surface speed greater than the speed of extrusion thereby yielding a stretch of from about 100 to about 2400%;
    (d) washing the film;

(e) subjecting the film to a temperature in the range of from about 100° to about 150° C. for from about 5 to about 30 seconds; and (f) recovering the film.

10. The process of claim 9 wherein the reaction mixture comprises 2,5-diamino-1,4-benzenedithiol dihydrochloride and weight of terephthalic acid in about equimolar amounts.

11. The process of claim 10 wherein polymerizing the reactants is performed at a temperature in the range of from about 150° to about 220° C. and a pressure of from about 720 to about 800 mm.Hg.

12. The process of claim 11 wherein polymerizing the reactants is performed in an atmosphere selected from the group consisting of nitrogen, helium, argon, neon, krypton, carbon dioxide and mixtures thereof.

13. The process of claim 12 wherein the casting roll has a surface speed of from about 1 to about 10 m./min.

14. The process of claim 13 wherein the casting roll is contacted with a coagulation bath comprised of an aqueous solution containing from about 0 to about 10% by weight of a material selected from the group consisting of phosphoric acid and methanol.

15. The process of claim 14 wherein the film is washed with a liquid selected from the group consisting of water and methanol.

16. The process of claim 15 wherein heating the film is conducted in an atmosphere comprised of nitrogen.

* * * * *